United States Patent [19]

Nelson

[11] Patent Number: 5,778,364

[45] Date of Patent: Jul. 7, 1998

[54] EVALUATION OF CONTENT OF A DATA SET USING MULTIPLE AND/OR COMPLEX QUERIES

[75] Inventor: Philip C. Nelson. Sunnyvale, Calif.

[73] Assignee: Verity, Inc.. Mountain View, Calif.

[21] Appl. No.: 581,853

[22] Filed: Jan. 2, 1996

[51] Int. Cl.$^6$ .................................................... G06F 17/30
[52] U.S. Cl. ...................... 707/6; 707/2; 707/3; 707/4; 707/5; 707/7
[58] Field of Search ........................ 395/602, 603, 395/601-9, 610-30; 707/2, 3, 4, 5, 6, 100-200

[56] References Cited

U.S. PATENT DOCUMENTS

| | | | |
|---|---|---|---|
| 3,618,027 | 11/1971 | Feng | 707/2 |
| 3,964,029 | 6/1976 | Babb | 707/6 |
| 5,043,872 | 8/1991 | Cheng | 707/2 |
| 5,091,852 | 2/1992 | Tsuchida | 707/2 |
| 5,218,536 | 6/1993 | McWherter | 707/533 |
| 5,335,345 | 8/1994 | Frieder | 707/5 |
| 5,412,807 | 5/1995 | Moreland | 707/3 |
| 5,442,778 | 8/1995 | Pedersen et al. | 707/5 |
| 5,488,722 | 1/1996 | Potok | 707/2 |
| 5,598,559 | 1/1997 | Chaudhuri | 707/2 |
| 5,608,904 | 3/1997 | Chaudhuri et al. | 707/2 |
| 5,649,221 | 7/1997 | Crawford | 707/532 |

*Primary Examiner*—Thomas G. Black
*Assistant Examiner*—Diane D. Mizrahi
*Attorney, Agent, or Firm*—Gray Cary Ware & Freidenrich

[57] ABSTRACT

The invention enables evaluation of the content of a set of data to determine whether the data set satisfies one or more queries. The invention enables rapid evaluation of large numbers of data sets much more rapidly than has previously been possible, even when the number of queries is large and/or the queries are complex. The queries are evaluated using an execution plan of query terms that is constructed from one or more specified queries by translating each query term of each query into one or more evidence descriptors and one or more combination operators, and operably relating each of the combination operators to at least one of the evidence descriptors or other combination operators, such that each query is defined by one or more of the evidence descriptors and one or more of the combination operators that are operably related to each other. Preferably, none of the evidence descriptors or combination operators are duplicated in the execution plan. The invention can be used to evaluate data sets of a variety of types, such as text documents and databases. The invention can be further optimized to achieve rapid evaluation of a data set with respect to the queries in two steps. First, one or more candidate queries that may be satisfied by the data set are identified by approximately evaluating each query. Second, each of the candidate queries is fully evaluated to determine whether the candidate query is satisfied by the data set.

57 Claims, 9 Drawing Sheets

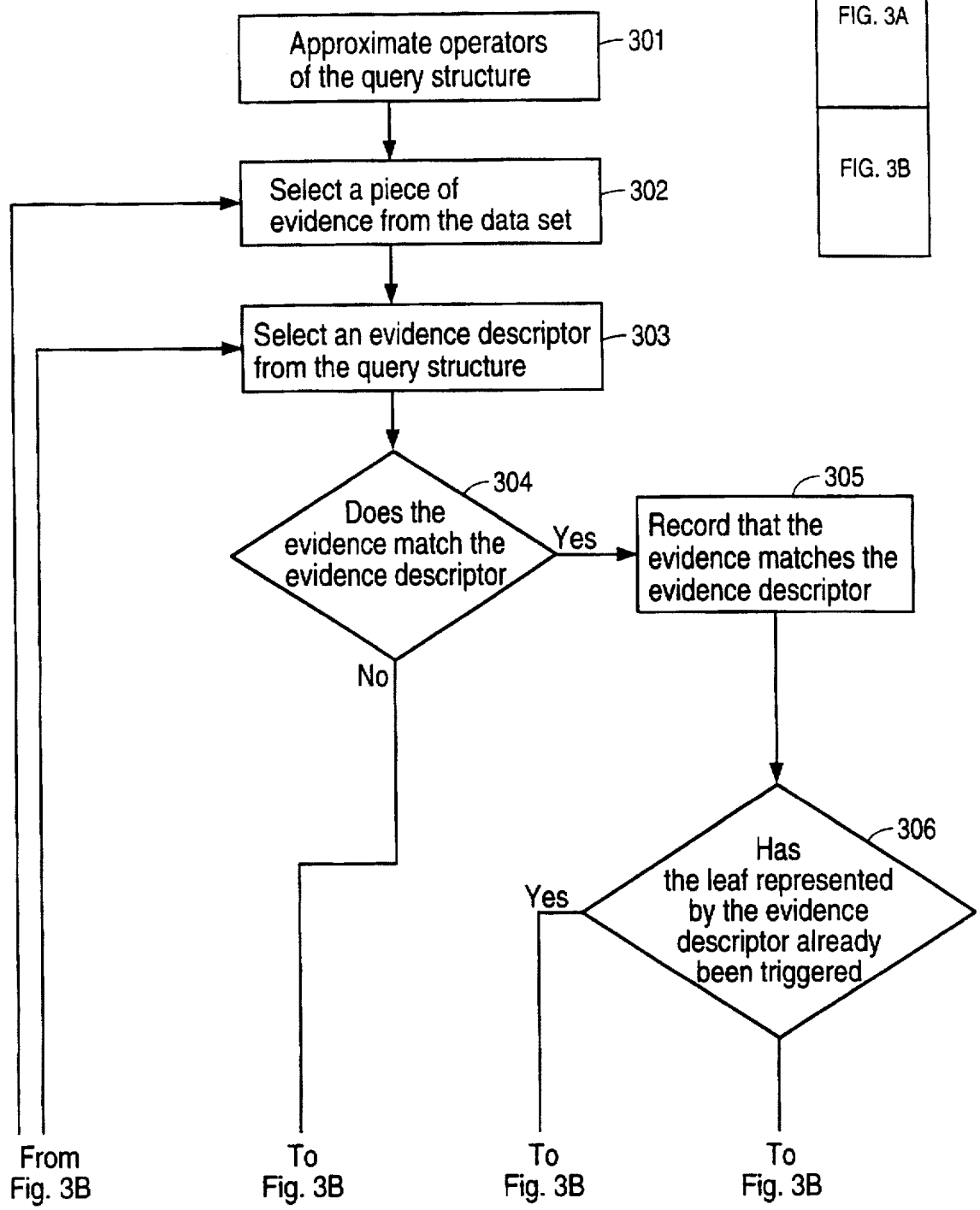

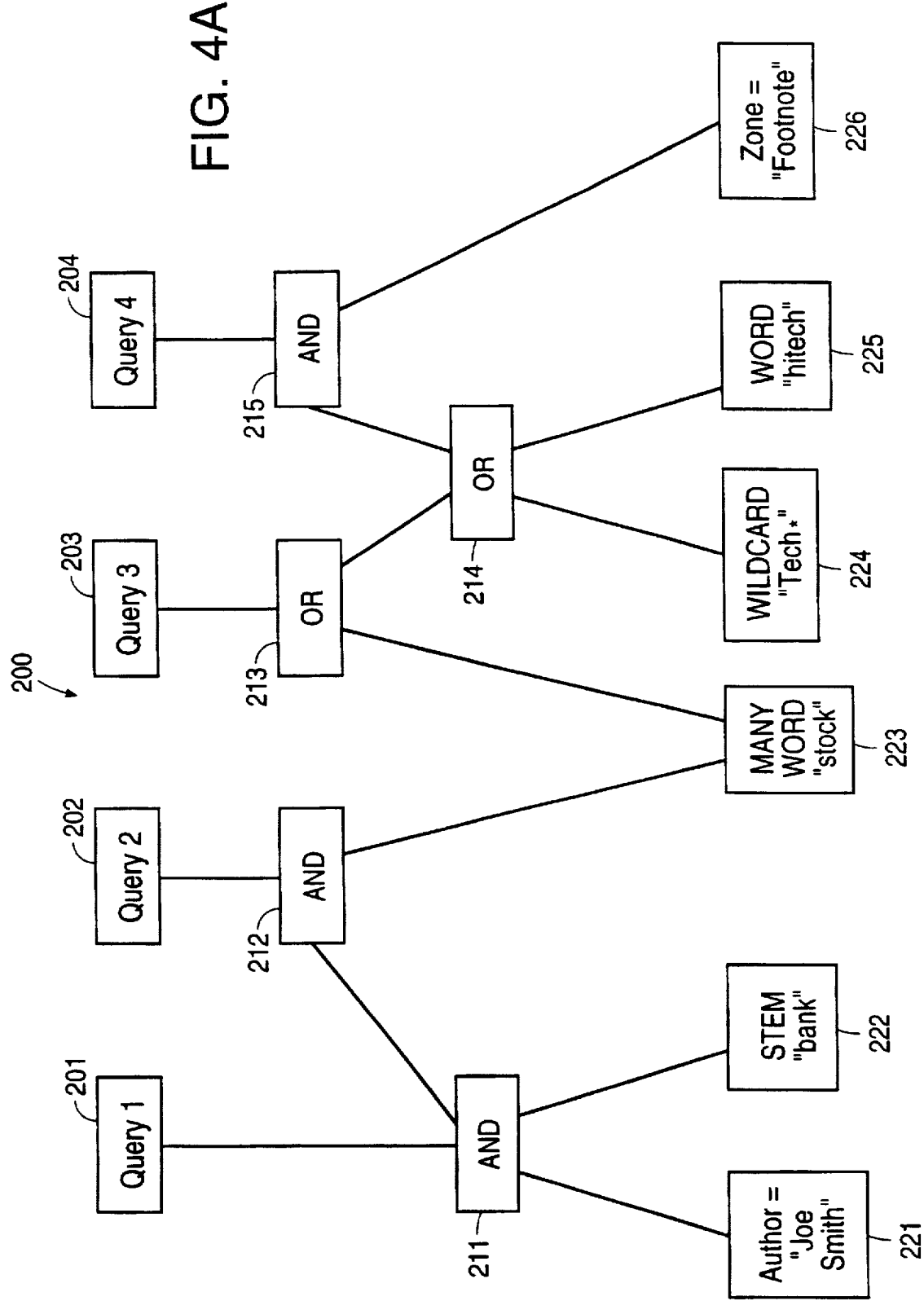

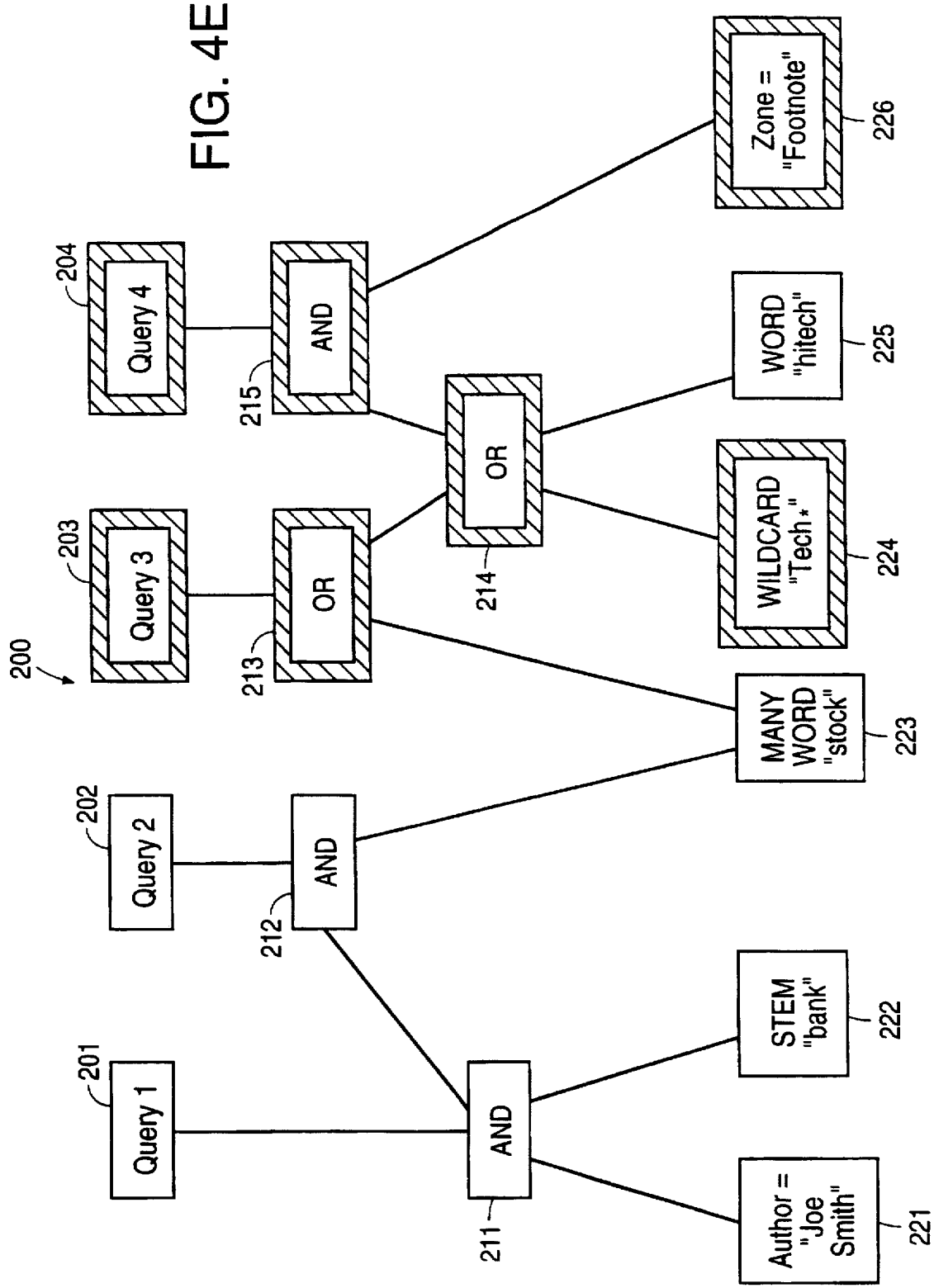

EVALUATION OF CONTENT OF A DATA SET USING MULTIPLE AND/OR COMPLEX QUERIES

BACKGROUND OF THE INVENTION

1. Field of the Invention

This invention relates to the evaluation of the content of a set of data to determine whether the set of data satisfies a set of one or more constraints. In particular, the invention relates to the evaluation of multiple sets of data using multiple complex sets of constraints.

2. Related Art

There are many situations in which it is desirable to evaluate a set of data to determine whether the set of data satisfies one or more constraints. For example, there may be a need to determine which, if any, of a number of text documents contain information regarding a particular topic. Or, there may be a desire to know whether particular information in a database has changed in a manner of interest.

Often, there are many entities that seek such evaluation of a data set, and each entity may seek such evaluation with respect to a set of constraints that is different from those of other entities, so that the data set must be evaluated with respect to a large number of sets of constraints. Further, the sets of constraints may be quite complex. Additionally, there may be a large number of data sets that must be evaluated.

Previously in such situations, each data set has been evaluated with respect to each set of constraints without regard to the other sets of constraints. However, when the number of sets of constraints is large, the sets of constraints are complex, or the number of data sets to be evaluated is large—or, in particular, when two or more of these circumstances exist—this approach can take an undesirably long time.

Moreover, typically the data sets are fully evaluated with respect to each set of constraints, with complete rigor as dictated by the set of constraints. As indicated, a set of constraints can be quite complex—either because the number of constraints is large or because the evaluation of particular constraints is not straightforward—so that such completely rigorous evaluation of the set of constraints is difficult and/or time consuming. The problem is exacerbated when the number of sets of constraints and/or the number of data sets to be evaluated is large.

It is desirable to be able to rapidly evaluate a set of data, in a manner that overcomes the above-described problems, to determine if the data set satisfies a set of constraints. In particular, it is desirable to be able to rapidly evaluate multiple sets of data to determine which, if any, of the data sets satisfy any of multiple, possibly complex, sets of constraints. Further, it is desirable that the evaluation be sufficiently rapid to make feasible the real-time evaluation of large numbers of data sets with respect to such sets of constraints.

SUMMARY OF THE INVENTION

Generally, the invention enables evaluation of the content of a set of data to determine whether the data set satisfies a set ("query") of one or more constraints ("query terms"). An important aspect of the invention is that large numbers of data sets can be evaluated much more rapidly than has previously been possible, even when the number of queries is large and/or the queries are complex.

In one aspect of the invention, a multiplicity of queries are combined into an execution plan for use in evaluating one or more sets of data to determine which, if any, of the sets of data satisfy one or more of the queries. Each of the queries of the execution plan is operably related to another of the queries of the execution plan. The relationship between the queries enables sets of data to be evaluated with respect to the queries in a more optimal manner than has previously been the case. For example, the execution plan allows a query term of one query that also appears in another query to be shared with that query so that the results of a single evaluation of the query term can be used in the evaluation of any query including that query term. Without such sharing, the query term would have to be evaluated separately for each query of which that query term is part. As can be appreciated, such sharing can reduce the amount of time required to evaluate a multiplicity of queries, particularly when the number of queries or the number of query terms in the queries is large. The relationship between queries can also be exploited to allow queries to be easily added to or deleted from the execution plan, so that the existing execution plan is not disrupted, thereby allowing modification of the execution plan without interrupting evaluation of a data set with respect to the existing execution plan. For example, a query to be added or deleted to the execution plan can be compared to the other queries of the execution plan to determine which, if any, of the query terms of the query to be added or deleted are different from the query terms of other queries in the execution plan. The similarities and differences can then be used to either add or delete only query terms that are unique to the query that is being added or deleted.

In another aspect of the invention, each query term of the queries of the execution plan includes one or more evidence descriptors that can be related to a combination operator. Each evidence descriptor describes a piece of evidence that represents a portion of the contents of the data set. The execution plan is evaluated by comparing each piece of evidence to one or more of the evidence descriptors and identifying each evidence descriptor that is satisfied by a piece of evidence. Each query term that includes a satisfied evidence descriptor or another query term that has been satisfied is evaluated to determine whether the query term is satisfied. Each query for which all query terms have been satisfied is identified as a query that is satisfied by the set of data. The evaluation of queries can be further optimized by identifying the type of each evidence descriptor and each piece of evidence, and evaluating only pieces of evidence that are of the same type as a type of one of the evidence descriptors. The query evaluation can also be further optimized by comparing each piece of evidence only to evidence descriptors that are of the same type as the piece of evidence. Additionally, the comparison of a piece of evidence to an evidence descriptor can be optimized based upon the type of the evidence and evidence descriptor.

In another aspect of the invention, a data set is evaluated with respect to the execution plan in two steps. First, one or more candidate queries that may be satisfied by the data set are identified. The identification of candidate queries can be done without engaging in a completely rigorous evaluation of each query, thereby enabling the identification to be performed quite quickly. For example, candidate queries can be identified by first approximating each query term, then evaluating the data set with respect to the approximated query terms. Each query for which all approximated query terms are satisfied by the data set is identified as a candidate query. Once the candidate queries have been identified, in the second step each of the candidate queries is evaluated to determine whether the candidate query is satisfied by the data set. In this step, each candidate query is evaluated rigorously according to the requirements of the (unapproximated) query terms of that query. Since, typically, the number of candidate queries is far less than the total number of queries, this second step can also be performed very rapidly. Overall, the two step approach of the invention requires far less time to perform than other previous approaches (such as a complete, rigorous evaluation of the data set with respect to each query).

The invention can be used to evaluate sets of data of a variety of types. For example, the invention can be used to evaluate each of an arbitrary number of text documents to determine whether one or more of the text documents satisfies any of an arbitrary number of user-specified queries regarding the content of the text documents. As another example, the invention can also be used to evaluate each of an arbitrary number of fields of a database to determine whether one or more of the fields satisfies any of an arbitrary number of user-specified queries regarding the content of the fields.

BRIEF DESCRIPTION OF THE DRAWINGS

FIGS. 3A and 3B together show a flow chart illustrating a method according to the invention for evaluating the content of a set of data to determine whether the set of data satisfies one or more queries.

FIGS. 4A through 4E are schematic diagrams of the execution plan of FIG. 2 that illustrate aspects of the operation of the method of FIGS. 3A and 3B. FIG. 4A illustrates the execution plan after approximation of the execution plan. FIG. 4B illustrates the activation of an evidence descriptor in the execution plan. FIG. 4C illustrates the activation of a query term in the execution plan. FIG. 4D illustrates the activation of a query in the execution plan, resulting from the activation of all of the query terms of that query. FIG. 4E illustrates the candidate queries that are activated after completion of the evaluation of a data set.

DETAILED DESCRIPTION OF EMBODIMENTS OF THE INVENTION

Figure 1:
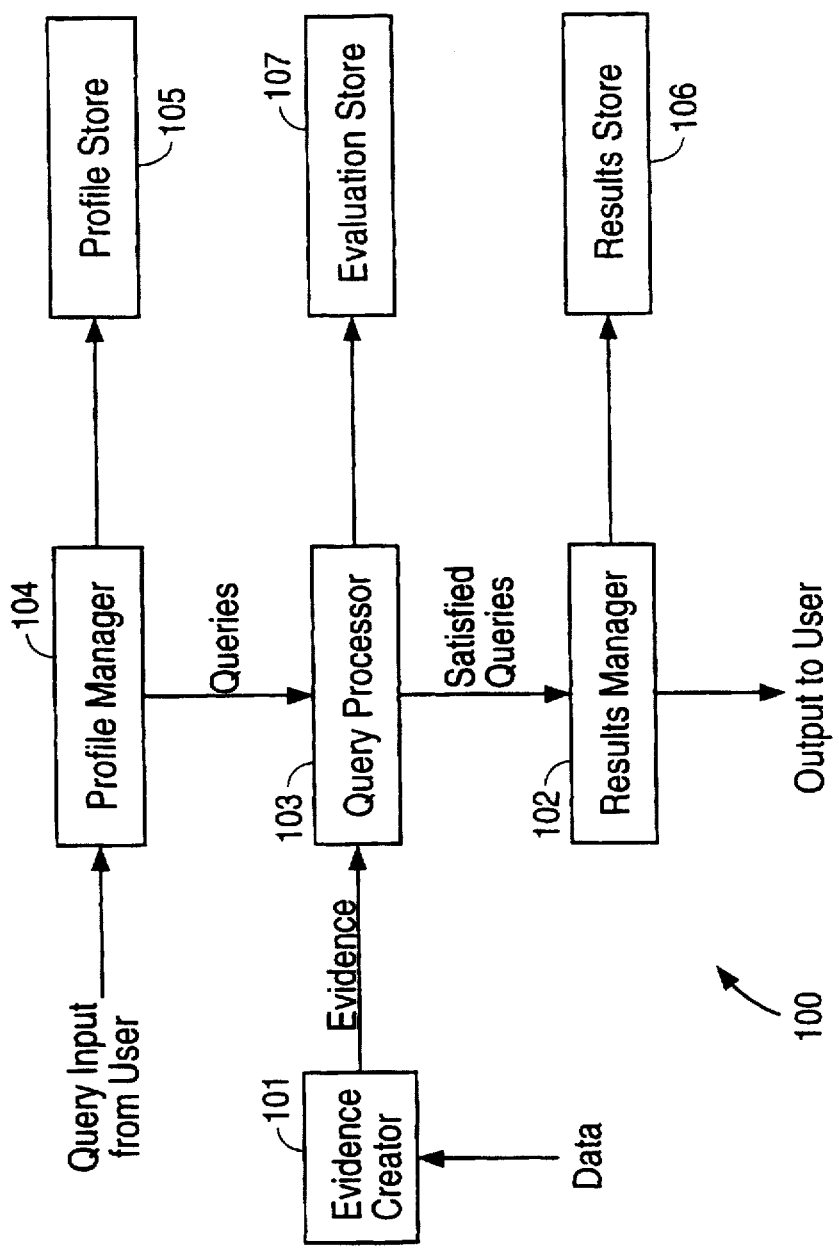
FIG. 1 is a block diagram illustrating a system according to the invention for evaluating the content of a set of data to determine whether the set of data satisfies one or more queries.

The invention enables evaluation of the content of a set of data to determine whether the set of data satisfies a set of one or more constraints. (Hereafter, the set of one or more constraints will be referred to as a "query" and each of the constraints will be referred to as a "query term".) The invention enables such evaluation to occur much more rapidly than has been the case with previous methods of evaluation. Of particular advantage, the invention enables the rapid evaluation of a data set where the number of queries is large and/or the queries are complex (i.e., including many query terms and/or including query terms that are complicated to evaluate). Any number of data sets can be evaluated, the benefits of the invention becoming greater as the number of data sets to be evaluated increases.

The invention makes use of a novel execution plan that enables the evaluation to be completed with more rapidity than has previously been the case. (As described in more detail below, an "execution plan" is a multiplicity of queries, in which each query is operably related to at least one other query.) The execution plan represents the multiple queries as a single object, thereby introducing efficiencies into the evaluation of a data set with respect to the queries. Additionally, the execution plan can enable computational resources to be shared by multiple queries, so that unnecessary redundancies are eliminated. For example, the execution plan can allow multiple queries to share a single query term that appears as part of each of the multiple queries, thus reducing redundant evaluation of query terms that appear in more than one query and thereby increasing the speed with which the execution plan of queries can be evaluated. The queries of the execution plan can also be related in a manner that enables queries to be easily added to or deleted from the execution plan so that the existing execution plan is not disrupted. The above-described sharing of query terms is particularly useful in this regard. As a result of the relationships between queries, and with the use of standard multiprocessing techniques, the execution plan can be modified without interrupting evaluation of a data set with respect to the existing execution plan. The reduction of redundant query terms also allows the queries of the execution plan to be represented in a very compact manner. Further, the execution plan allows computational resources (e.g., memory management, use of tables and indexes) to be shared by multiple queries so that unnecessary redundancies are eliminated.

Each query term of the queries of the execution plan includes one or more evidence descriptors. (The execution plan can, and typically does, also include combination operators, which are discussed in more detail below.) Each evidence descriptor describes a piece of evidence that represents a portion of the contents of the data set. Each piece of evidence of the execution plan can be compared to one or more of the evidence descriptors to enable identification of each evidence descriptor that is satisfied by a piece of evidence. Each query term that includes a satisfied evidence descriptor is evaluated to determine whether the query term is satisfied. Other query terms that include satisfied query terms are also evaluated. Each query for which all query terms are satisfied is identified as a query that is satisfied by the set of data.

The evaluation of queries can be further optimized in several ways. For example, the type of each evidence descriptor and each piece of evidence can be identified, and only pieces of evidence from the data set that are of the same type as a type of one of the evidence descriptors are evaluated. Further, each piece of evidence that is evaluated can be compared only to evidence descriptors that are of the same type as the piece of evidence. Additionally, the comparison of a piece of evidence to an evidence descriptor can be optimized based upon the type of the evidence and evidence descriptor.

The invention can use a two-step process to achieve even more rapid evaluation of a data set. First, one or more candidate queries that may be satisfied by the data set are identified. The candidate queries are identified by approximating the query terms of the execution plan and then evaluating the data set with respect to the approximated query terms, each query for which all approximated query terms are satisfied being a candidate query. As will be more readily apparent from the description below, this enables identification of candidate queries to be accomplished without engaging in a complete, rigorous evaluation of each query term, thereby enabling the identification of candidate queries to be completed very rapidly.

Second, once the candidate queries have been identified, the data set is evaluated with respect to each of the candidate queries to determine whether any of the candidate queries are satisfied by the data set. In this step, all of the query terms candidate queries are completely and rigorously evaluated, as dictated by the unapproximated query terms of the candidate queries. Since, for many applications of the invention, the number of candidate queries is much less than the total number of queries, this second step can also be performed very rapidly. In practice, then, for many applications for which the invention can be used (in particular, for applications in which the number of queries is large and/or the queries are complex), the two step approach of the invention requires far less time to perform than other previous approaches (e.g., a complete, rigorous evaluation of the data set with respect to each query).

FIG. 1 is a block diagram illustrating a system 100 according to the invention for evaluating the content of a set of data to determine whether the data set satisfies one or more queries. The system 100 includes an evidence creator 101, a results manager 102, a query processor 103, a profile manager 104, a profile store 105, a results store 106, and an evaluation store 107. As will be apparent, the functions (described in more detail below) of the evidence creator 101, results manager 102, query processor 103 and profile manager 104 can be implemented on an appropriately programmed digital computers. Each of the profile store 105, results store 106 and evaluation store 107 can be implemented, for example, with either or both of a volatile memory such as a random access memory (RAM) and a non-volatile memory such as a hard disk storage device.

The data sets to be evaluated are first input to the evidence creator 101. The data sets can come from any source, such as news wire feeds or databases. The evidence creator 101 parses and processes the data to create pieces of evidence that can be recognized by the query processor 103. Creation of evidence from a data set can be performed in a variety of ways depending upon the nature of the data sets that are to be evaluated. The techniques used can range from simple word recognition algorithms (e.g., identification of anything between consecutive occurrences of white space in a document as a "word") to very complex analysis of the contents of the data set. Particular techniques for creating evidence from a data set (e.g., a text document or database) are known to those skilled in the art.

Generally, each piece of evidence includes: i) the type of the evidence, ii) the evidence data, and iii) the location of the evidence within the data set. The invention can be used with data sets including evidence of any type. The following is an illustrative list of evidence types (discussed in more detail below) that can be used with the invention when evaluating textual data sets: NewDataSet, Word, WordInfo, Number, Date, Name, Paragraph, Sentence, Punct, NewLine, White, Markup, Field, ZoneBegin, ZoneEnd, Attribute and Highlight. For other types of data sets, evidence can be of other types that are characteristic of that type of data set. For example, if the data sets that are being evaluated are electronic mail messages, evidence types could include the sender of a message or the date the message was sent. Or, if the data sets being evaluated are databases, evidence types could include the sum or average of a set of numeric values.

The evidence data represents the actual data from the data set that is extracted as part of the creation of evidence. The evidence data might be, for example, a word from a document, the date on which an electronic mail message was sent, a sentence from a document, the value of a field in a database, or the identification of a part of speech of a word from a document.

The location of the evidence within the data set can be specified in any suitable manner, such as, for instance, the location of the evidence relative to a reference location within the data set. For example, in a text document, the location of the evidence could be specified by identifying the number of words occurring in the document prior to the evidence. The location of the evidence can be important for the evaluation of certain types of query terms, such as query terms that include proximity combination operators (discussed below).

Above, several illustrative evidence types were identified. The NewDataSet evidence type identifies the start of a data set (e.g., document). The Word evidence type identifies a textual word. The WordInfo evidence type identifies a particular characteristics of a word or words, such as the base form (stem), part of speech and usage. The Number evidence type identifies a number, regardless of how the number is expressed (e.g., "one thousand", "$10^3$", "1000" all are identified as 1000). The Date evidence type identifies a date, regardless of how the date is expressed (e.g., "Feb. 1, 1995", "today", "last night" all are identified with a numerical designation that specifies a year, month, day and time). The Name evidence type identifies a word or phrase that specifies a proper name, a company name or a product name. The Paragraph evidence type identifies the end of a paragraph. The Sentence evidence type identifies the end of a sentence. The Punct evidence type identifies punctuation. The NewLine evidence type identifies the beginning of a new line in a text document (e.g., a carriage return or a line feed). The White evidence type identifies white space in a text document. The Markup evidence type identifies an inline formatting markup (e.g., bold or italics). The Field evidence type identifies a named attribute of a document (e.g., the publisher or a document or the sender of an E-mail message). The ZoneBegin and ZoneEnd evidence types identify the beginning and end, respectively, of a named subregion ("zone") within a document (e.g., footnote). The Attribute evidence type identifies an attribute of a zone (e.g., whether a footnote is the first, second, etc. footnote in a document). The Highlight evidence type identifies an important section of a set of data.

Returning to FIG. 1, one or more users inputs information to the profile manager 104. The profile manager can cause this information to be stored in the profile store 105 for later use, e.g., retrieval and editing of a query by a user. The profile manager 104 also transmits this information to the query processor 103 which, in turn, uses the information to construct appropriate queries. According to the invention, the query processor 103 can amalgamate queries into an integrated execution plan representing multiple queries, in which each query is operably related to another query. Importantly, the formation of the execution plan enables computational resources to be shared by multiple queries so that unnecessary redundancies are eliminated. For example, the execution plan can be stored in a memory as a single object. In other words, each query is stored in memory with some knowledge of the location of one or more other queries in memory (using, for example, pointers to other memory locations at which another query is stored) so that any portion of the execution plan can be accessed easily, or so that some or all of the execution plan can be easily moved in memory from one location to another. Additionally, as will be more readily appreciated from the description below, the combination of queries into a single execution plan allows tables and indexes that are used in matching evidence from a data set to evidence descriptors that are part of queries to be integrated so that redundant tables and indexes are reduced or eliminated. Further, as discussed more below, query terms that appear as part of more than one query can be shared, thereby reducing or eliminating redundant query terms for the execution plan. The combination of multiple queries into an execution plan is particularly useful for many applications for which use of the invention is contemplated, since the queries used may be used over a long period of time with little or no change, thus accentuating the above-described benefits associated with the sharing of resources by the execution plan.

This aspect of the invention (combining the queries into an execution plan) represents a sharp contrast to previous methods of evaluating one or more data sets with respect to multiple queries. A previous approach has been to combine the data sets into a single object or database. The queries exist independent of each other. Each query is evaluated with respect to the database independent of the evaluation of other queries. Thus, there is no sharing of resources with respect to the storage or evaluation of the queries. As indicated above, this approach can take an undesirably long time. In contrast the sharing of resources enabled by the execution plan according to the invention facilitates rapid evaluation of a data set with respect to multiple queries.

During evaluation of a data set with respect to the execution plan by the query processor 103, some or all of the execution plan is stored in the evaluation store 107 for use by the query processor 103. Since, in many cases, the entire execution plan is quite large, typically, the entire execution plan is stored in a high storage capacity memory such as a hard disk. (The unified memory management enabled by the execution plan can be useful in backing up from the hard disk, and restoring to the hard disk, some or all of the execution plan.) Portions of the execution plan with respect to which the query processor 103 is evaluating evidence at a particular time can be transferred from the hard disk to a rapidly accessible memory such as a RAM so that those portions of the execution plan can accessed more rapidly. The unified memory management enabled by the execution plan of the invention is particularly useful in enabling this interaction between the hard disk and RAM.

In a particular embodiment, an execution plan in accordance with the invention is represented as a network of roots, nodes and leaves. Each root of the execution plan represents a particular query. Each query includes one or more query terms. Each query term includes one or more expressions; if the query term includes more than one expression then the expressions are related by one or more combination operators. Each node of the execution plan represents a combination operator. Each expression can be a query term or an evidence descriptor. Each leaf represents one of the evidence descriptors. Each evidence descriptor uses an evidence operator and evidence pattern to describe a piece of evidence or the characteristics of a piece or pieces of evidence. A particular example of a network of queries in accordance with this embodiment of the invention is discussed below with respect to FIG. 2.

An execution plan according to the invention can be represented other than as a network of queries. The execution plan can be represented, for example, in various ways, such as an optimized sequence of customized instructions that correspond to the evidence descriptor and query terms of the queries of the execution plan. The instructions are established so that they can be processed quickly by customized software of hardware. For example, a query that uses the MAX operator to determine the maximum of three evidence descriptors X, Y, and Z can be represented in a sequence of assembly instructions as follows: PUSH X, PUSH Y, PUSH Z, MAX 3.

Returning to FIG. 1, queries that have been specified by a user are presented to the query processor 103. Each new query presented by a user is parsed by the query processor 103 into query terms. Each query term is further parsed by the query processor 103 into a combination operator and one or more evidence descriptors. The parsing of user-specified queries by the query processor 103 can be done using techniques known to those skilled in the art. It is important to note, though, that the evidence descriptors created by the query processor 103 must be compatible with the evidence of the data sets that are to be evaluated (created by the evidence creator 101). The combination operators and evidence descriptors of a query are related to each other by the query processor 103 so that the content of the query is accurately represented. Generally, then, a single query can be represented as a small execution plan of one or more query terms and evidence descriptors.

Before a query is added to the execution plan, each of the query terms and evidence descriptors of the query are compared to existing query terms and evidence descriptors of the execution plan. This can be accomplished using the matching methods and the query evaluation method described below. If a query term or evidence descriptor of the new query is the same as an existing query term or evidence descriptor of the execution plan, then this query term or evidence descriptor need not be reproduced in the execution plan. Only new query terms and evidence descriptors of the query are added to the execution plan. The new query terms and/or evidence descriptors are added to the execution plan so that they have the same relationship to existing query terms and evidence descriptors of the execution plan as they had to the redundant query terms and evidence descriptors of the new query. Thus, the new query can be added to the execution plan (with the use of standard multiprocessing techniques) without disturbing the existing queries, so that at any given time, a data set is being compared to either the old or the updated execution plan, thereby enabling the evaluation of a data set with respect to the execution plan to continue while the execution plan is being modified.

Similarly, when a query is deleted from the execution plan, each of the query terms and evidence descriptors of that query are compared to query terms and evidence descriptors of other queries of the execution plan. If a query term or evidence descriptor of the query to be deleted is the same as a query term or evidence descriptor of another query of the execution plan, then this query term or evidence descriptor cannot be deleted from the execution plan. Only unique query terms and evidence descriptors of the query to be deleted can be deleted from the execution plan. Thus, queries can be deleted (again, with the use of standard multiprocessing techniques) from the execution plan without disturbing the other queries of the execution plan.

As described above, the invention can make use of an execution plan in which queries are operably related to each other. As part of the construction of the execution plan, the query processor 103 can eliminate redundant query terms and evidence descriptors from the execution plan when a particular query term or evidence descriptor appears in more than one query. Such redundant query terms and evidence descriptors can be identified as described above. According to the invention, each query term and evidence descriptor can be part of any number of queries. Further, it is only necessary that a particular query term or evidence descriptor appear one time in the execution plan. This aspect of the invention enables multiple complex queries to be represented compactly and efficiently, since query terms and evidence descriptors can be shared among queries.

Execution plans according to the invention can advantageously be represented using fixed-size data structures using known link list techniques. In a particular embodiment, each of the queries, combination operators and evidence descriptors of the execution plan can be represented by a fixed-size data structure including two fixed-size fields. One field specifies the identity of a "parent link" and the other field specifies the identity of a "child link". Each of the identities can be specified, for example, as the memory address of the identified link. Each of the queries, combination operators and evidence descriptors are related to other of the queries, combination operators and evidence descriptors using data structures called "links". Each of the links is a fixed-size data structure including four fixed-size fields. A first field specifies the identity of a "parent node", a second field specifies the identity of a "next parent link", a third field specifies the identity of a "next child link", and a fourth field specifies the identity of a "child node". Each of the identities can be specified, for example, as the memory address of the identified link or node.

The use of fixed-size data structures to create an execution plan facilitates achievement of the above-described benefits of an execution plan in accordance with the invention. The use of fixed-size data structures enables the parts of the execution plan to be logically addressed in an well-defined manner so that the data structures representing new query terms can be added or deleted without need to reallocate memory for the data structures of other existing, unchanged query terms. In contrast, if the query terms were represented with data structures of variable length, the deletion of a query term, for example, might cause the reallocation of memory for the data structures of one or more unchanged query terms so that an ongoing evaluation of a data set with respect to the execution plan is disrupted. Further, since the data structures according to the invention are simply pointers to other locations in memory, the addition of new queries without adding redundant query terms can be easily accomplished. The new query terms of the new query are simply configured to point to the memory locations of the appropriate existing query terms. Conversely, the use of such pointers enables a single query term in the execution plan to be part of any number of queries. Additionally, construction of an execution plan in this manner enables related parts of the execution plan to be addressed in contiguous sections of memory. Consequently, if the execution plan is large enough to necessitate swapping of portions of the execution plan from a hard disk to a RAM, the related portions of the execution plan (that are likely to be accessed proximate in time to each other) can be easily swapped as one contiguous region of memory.

Figure 2:
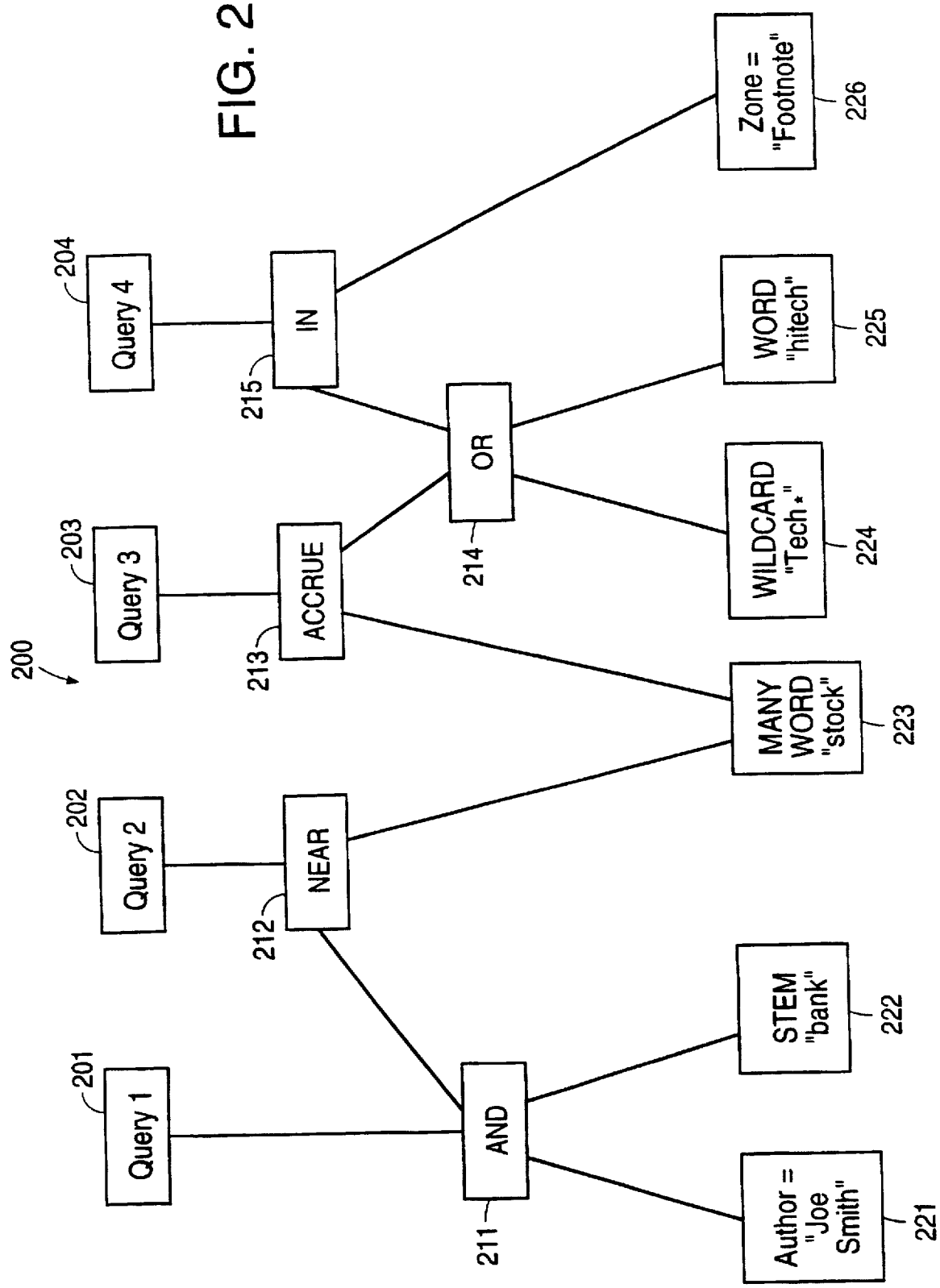
FIG. 2 is a schematic diagram illustrating an execution plan in accordance with the invention.

FIG. 2 is a schematic diagram illustrating an execution plan 200 in accordance with the invention that might be used, for example, in evaluation of one or more text documents. The execution plan 200 includes four roots 201, 202, 203 and 204, each representing one of four queries. The execution plan 200 also includes five nodes 211, 212, 213, 214 and 215, each representing a combination operator that is part of one or more of the queries. The execution plan 200 also includes six leaves 221, 222, 223, 224, 225 and 226, each representing an evidence descriptor. Generally, an execution plan according to the invention can include a combination of any number of roots, any number of nodes and any number of leaves.

The execution plan 200 shown in FIG. 2 is relatively simple. For many applications, an execution plan in accordance with the invention can include thousands of queries (e.g., 10,000), resulting in an execution plan that has thousands of nodes (e.g., 100,000) and thousands of leaves (e.g., 1,000,000). Further, though the execution plan 200 can be represented in two dimensions in FIG. 2, very complicated execution plans, in which each node can be connected to many other nodes and leaves, and each leaf can be connected to many nodes, may require any number of dimensions for representation.

The execution plan 200 includes four types of evidence operators (=, STEM, WORD and WILDCARD) and five types of combination operators (AND, NEAR, ACCRUE, OR and IN). More generally, an execution plan in accordance with the invention can include any of a large number of evidence and combination operators. A description of an illustrative set of operators that can be used with the invention is given below. A more detailed description of these operators is given in the user's manual accompanying the commercially available Topic® Tools product produced by Verity, Inc. of Mountain View, Calif. The pertinent sections (in particular, Chapter 12) of the user's manual are incorporated by reference herein.

As indicated, the operators that can be used to construct queries according to the invention fall into two broad categories: 1) evidence operators that can be used to describe evidence, and 2) combination operators that can be used to combine query terms. Evidence operators can include, for example, field-based operators, word-based operators, expansion operators and date-based operators. Combination operators can include, for example, proximity operators and mathematical operators.

Field-based evidence operators modify evidence patterns to define particular evidence that can appear within a field. Herein, a "field" is an attribute of a data set, such as the author, title or date of publication. Field-based evidence operators can, for example, include the following operators: <, >, =, >=, <=, START, ENDS, SUBSTRING, WILDCARD (field-based) and CONTAINS. The <, >, =, >=, and <=operators each define evidence based upon a comparison (as dictated by the particular operator) with an evidence pattern that is expressed as a number or an alphanumeric string. The START and END operators specify that a particular field begin or end, respectively, with an evidence pattern that is expressed as an alphanumeric string. The SUBSTRING operator specifies that a particular field include, anywhere within the field, an evidence pattern that is expressed as an alphanumeric string. The WILDCARD (field-based) operator specifies that a particular field include anywhere within the field, subject to certain restrictions, an evidence pattern that is expressed as an alphanumeric string. The CONTAINS operator is a mixture of the SUBSTRING and WILDCARD operators that specifies that a particular field include, without regard for punctuation, an evidence pattern that is expressed as an alphanumeric string.

Word-based evidence operators modify evidence patterns to define particular evidence that can appear anywhere with the data set. Word-based evidence operators can include, for example, the following operators: WORD, STEM, SOUNDEX, WILDCARD and TYPO. The WORD operator specifies evidence that exactly matches an evidence pattern that is expressed as an alphanumeric string. The STEM operator specifies evidence that has the same linguistic form as an evidence pattern that is expressed as an alphanumeric string. The SOUNDEX operator specifies evidence that is phonetically similar (using any of a number of standard methods for making such determination) to an evidence pattern that is expressed as an alphanumeric string. The WILDCARD operator specifies evidence that includes anywhere within the evidence, subject to certain restrictions, an evidence pattern that is expressed as an alphanumeric string. The TYPO operator specifies evidence that is similar in spelling (using a method that counts the letter differences between two words) to an evidence pattern that is expressed as an alphanumeric string.

Expansion evidence operators modify evidence patterns to define particular evidence in an open-ended manner. Expansion evidence operators can include, for example, the following operators: THESAURUS and SUGGEST. The THESAURUS operator specifies evidence that includes all dictionary derived synonyms of an evidence pattern that is expressed as a text word. The SUGGEST operator specifies evidence that includes all statistically related words of an evidence pattern that is expressed as a text word (e.g., the word "leveraged" might satisfy the SUGGEST operator when the evidence pattern is "buyout").

Date-based evidence operators modify evidence patterns to define particular evidence based upon the time at which the set of data of which the evidence is part was created. Date-based evidence operators can include, for example, the following operators: RECENT and RANGE. The RECENT operator defines evidence that was created within a specified time period from the present time. The RANGE operator defines evidence that was created within a specified time range.

Proximity combination operators cause the position of query terms relative to each other within a data set to be evaluated. Proximity combination operators can include, for example, the following operators: NEAR, WITHIN, PARAGRAPH, SENTENCE, ADJACENT, PHRASE, IN and IN/WHEN. The NEAR operator evaluates the proximity of two query terms within a data set and reports a score indicating the proximity. The WITHIN operator evaluates whether two query terms are within a specified proximity of each other. The PARAGRAPH operator evaluates whether two query terms are within a defined paragraph. The SENTENCE operator evaluates whether two query terms are within a defined sentence. The ADJACENT operator evaluates whether two query terms are adjacent to each other within the data set. The PHRASE operator evaluates whether two query terms are adjacent to each other within the data set and in a designated order. The IN operator evaluates whether two query terms are within a defined zone within the data set. The IN/WHEN operator whether two query terms are within a defined zone within the data set when that zone has certain specified attributes.

Mathematical combination operators evaluate a combination of query terms. Mathematical combination operators can include, for example, the following operators: AND, OR, ACCRUE, AVERAGE, SUM, PRODUCT, NOT, and COMPLEMENT. The AND operator evaluates a set of query terms to ascertain a "worst" value of the query terms. The OR operator evaluates a set of query terms to ascertain a "best" value of the query terms. The ACCRUE operator counts the number of query terms having a specified value. The AVERAGE operator calculates the average of a set of query terms. The SUM operator calculates a sum of a set of query terms. The PRODUCT operator calculates a product of a set of query terms. The NOT operator ascertains whether an evidence descriptor does not appear in a data set. The COMPLEMENT operator ascertains whether the inverse of an evidence descriptor appears at all in a data set.

Additionally, query terms can include modifiers. Modifiers, as the name implies, can be used to modify one or more of the above-described operators. Modifiers that can be used with the invention include, for example, MANY, CASE and ORDER. The MANY modifier specifies an increased level of occurrence of evidence descriptors or query term values, as appropriate to the operator being modified, necessary for satisfaction of an evidence descriptor or query term. The MANY modifier can be used to modify word-based evidence operators and proximity combination operators. The CASE modifier specifies that the case (uppercase or lowercase) of the evidence must match that of the evidence descriptor. The CASE modifier can be used to modify field-based evidence operators and word-based evidence operators. The ORDER modifier specifies that query terms must be in a specified order within the data set. The ORDER modifier can be used to modify proximity combination operators.

The types of evidence descriptors that can be used with an execution plan according to the invention correspond generally to the types of evidence that can be created from the data sets that are to be evaluated. The execution plan 200 of FIG. 2 includes Word, Field and Zone evidence descriptors. More generally, an execution plan in accordance with the invention can include any of a large number of types of evidence descriptors. Some examples of the evidence descriptors that can be used are discussed above with respect to the types of evidence that can be formed by the evidence creator 101 (FIG. 1).

Returning to FIG. 2, the root 201 represents Query 1. Query 1 is satisfied by any text document (i.e., data set) that is authored by Joe Smith and that includes words having the stem "bank" (such as "banking", "banker" and "banks"). The leaf 221 represents the evidence descriptor that requires that the document be authored by Joe Smith. The evidence descriptor of leaf 221 uses the field evidence operator "=" and the evidence pattern "Joe Smith" to define a particular type of evidence that must appear in the field "Author" in a text document. The leaf 222 represents the evidence descriptor that requires that the document include words whose base form is "bank". The evidence descriptor of leaf 222 uses the word evidence operator STEM and the evidence pattern "bank" to define a particular type of evidence that must appear anywhere in a text document. The node 211 connects the evidence descriptors of the leaves 221 and 222 with the mathematical combination operator AND to form the complete Query 1.

The root 202 represents Query 2. Query 2 is satisfied by any text document that satisfies Query 1 and that satisfies a nearness constraint relating Query 1 to the frequency of occurrence of the word "stock" in the text document. The leaf 223 represents the evidence descriptor that requires that the word "stock" occur in the document. The evidence descriptor of leaf 223 uses the word evidence operator WORD, the evidence pattern "stock" and the modifier MANY to define a particular type of evidence that is satisfied by a particular predetermined frequency of occurrence of the word "stock" in the document. The node 212 connects the node 211 (and, thus, Query 1) to the evidence descriptor of the leaf 223 with the proximity combination operator NEAR to form the complete Query 2.

The root 203 represents Query 3. Query 3 is satisfied by any text document that includes enough occurrences of words that begin with "tech", the word "hitech" or the word "stock" in the text document. The leaf 224 represents the evidence descriptor that requires that words beginning with "tech" occur in the document. The evidence descriptor of the leaf 224 uses the word evidence operator WILDCARD and the evidence pattern "tech" to define a particular type of evidence that must appear anywhere in a text document. The leaf 225 represents the evidence descriptor that requires that the word "hitech" occur in the document. The evidence descriptor of leaf 225 uses the word evidence operator WORD and the evidence pattern "hitech" to define a particular type of evidence that must appear anywhere in a text document. The node 214 connects the evidence descriptors of the leaves 224 and 225 with the mathematical combination operator OR to form the a query term that is satisfied by occurrence of either a word beginning with "tech" or the word "hitech". The node 213 connects the node 214 (and, thus, the corresponding query term) to the evidence descriptor of the leaf 223 with the mathematical combination operator ACCRUE to form the complete Query 3.

The root 204 represents Query 4. Query 4 is satisfied by any text document that includes the evidence sought by the query term defined by node 214 in a footnote of the document. The leaf 226 represents the evidence descriptor that requires that the text document include a footnote zone. The evidence descriptor of leaf 226 uses the field evidence operator "=" and the evidence pattern "footnote" to define a particular type of zone that must appear in the text document. The node 215 connects the node 214 (and, thus, the query term defined by that node) to the evidence descriptor of the leaf 226 with the proximity combination operator IN to form the complete Query 4.

Returning to FIG. 1, the evidence is input to the query processor 103. The query processor 103 evaluates each piece of evidence with respect to the queries of the execution plan that has been created by the query processor 103. The pieces of evidence from the data set are compared to the evidence descriptors. When a piece of evidence matches an evidence descriptor, identification of the piece of evidence that matched the corresponding evidence descriptor is recorded. The information identifying evidence that matched particular evidence descriptors may be necessary in the further evaluation of query terms. As evidence descriptors are matched, each query term that includes a matched evidence descriptor is also evaluated. Query terms that are satisfied are identified. As query terms are satisfied, additional query terms that include satisfied query terms are also evaluated. When all of the query terms and/or evidence descriptors of a query are satisfied, then the query is identified as satisfied by the set of data. The evaluation, identification of satisfied query terms and evidence descriptors, and further evaluation of query terms continues as described above until all of the evidence of a data set has been processed or (unlikely in typical situations in which the invention is used) all of the queries have been identified as satisfied. Though, typically all of the evidence of a data set is evaluated, this need not necessarily be the case, since, in many cases, evaluation of less than all of the evidence of a data set is sufficient to determine whether the data set satisfies any of the queries of the execution plan.

As described above, both the pieces of evidence and the evidence descriptors can be categorized according to type. In one embodiment of the invention, information regarding the types of evidence descriptors that are part of an execution plan is input to the evidence creator 101. The evidence creator 101 can then create from data sets only evidence of types that correspond to the types of evidence descriptors that appear in the execution plan.

Each piece of evidence from a data set can be compared to all of the evidence descriptors of the execution plan. However, in another embodiment of the invention, each piece of evidence is only compared to evidence descriptors that are of the same type. Since pieces of evidence need only be compared to a subset of all of the evidence descriptors, rather than all of the evidence descriptors, this embodiment makes the evaluation of the data set with respect to the execution plan even faster.

Additionally, different matching techniques can be used for different categories of evidence and evidence descriptors, the technique chosen being particularly advantageous for use with that category. For example, a finite state machine can be used to determine matches between wildcard evidence and evidence descriptors. A binary search method can be used to determine matches between field evidence and evidence descriptors. A hash tree can be used to determine matches between word evidence and evidence descriptors. The use of optimum matching techniques for each category of evidence and evidence descriptor further increases the speed with which the invention can evaluate a data set with respect to an execution plan.

As described above, an execution plan according to the invention can include evidence operators, combination operators and modifiers of many different types. The evaluation of query terms including some of these operators and/or modifiers ("complex operators"), such as the NEAR operator or the MANY modifier, can be quite complicated and time consuming. This can be because the evaluation process for the operator is complicated and/or because the operator requires evaluation of a large portion of the evidence of a data set to determine whether the query term including the operator is satisfied. The evaluation of query terms including other operators ("simple operators") can be relatively straightforward, such as is the case in some query terms that use the AND and OR operators. As explained below, a method according to an embodiment of the invention exploits the difference in ease with which complex and simple operators can be evaluated to enable a two step evaluation of a data set with respect to a large set of complex queries much more rapidly than has previously been possible.

Figure 3B:
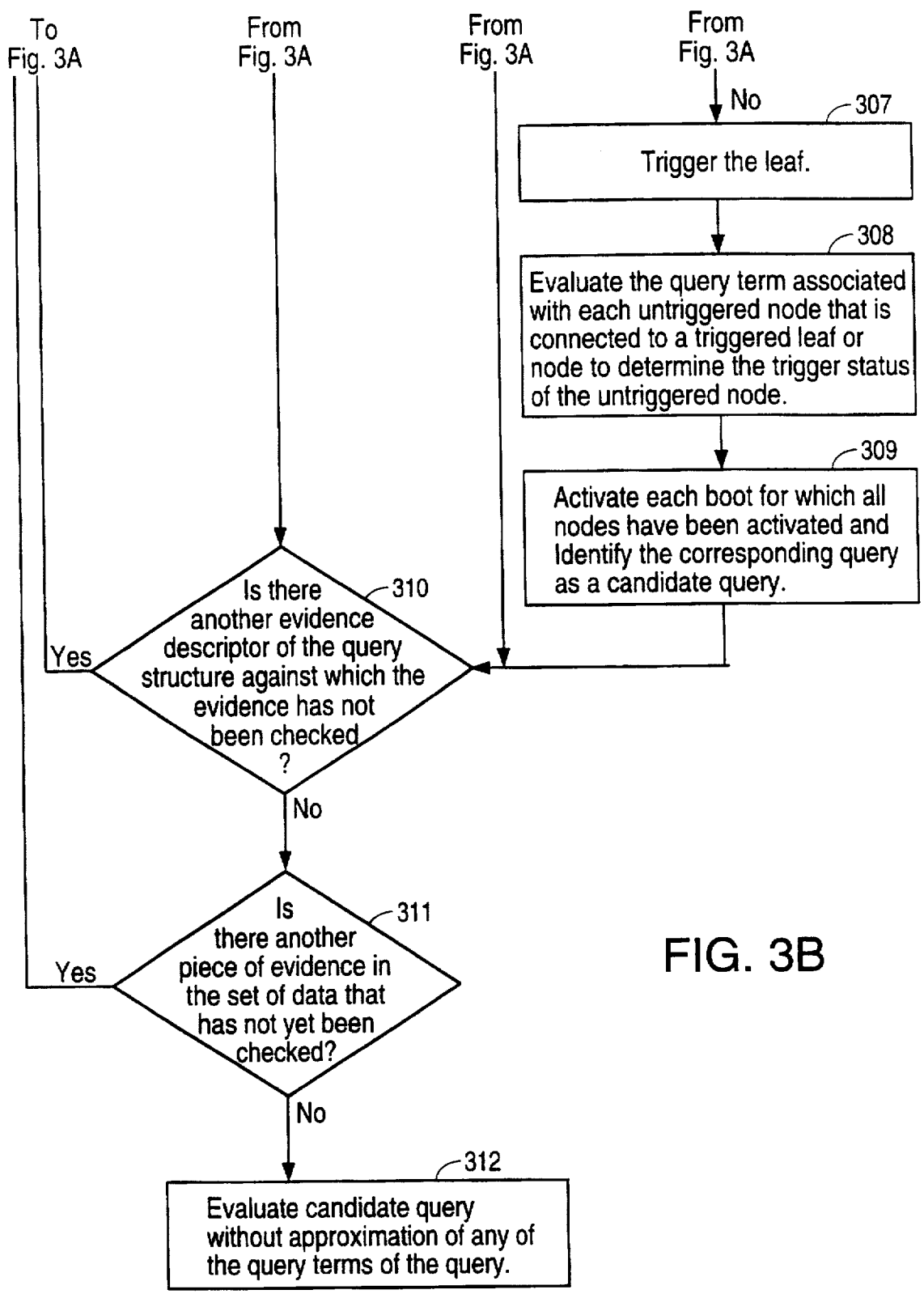

FIGS. 3A and 3B together show a flow chart illustrating a method 300 according to the invention for evaluating the content of a set of data to determine whether the data set satisfies one or more queries. FIGS. 4A through 4E are schematic diagrams of the execution plan 200 (FIG. 2), discussed above, that illustrate aspects of the operation of the method 300. In the system 100 of FIG. 1, the method 300 is performed by the query processor 103. As indicated above, the invention evaluates a data set with respect to an execution plan in two steps. The identification of candidate queries that may be satisfied by the data set is accomplished in the method 300 by steps 301 through 311. The evaluation of the data set with respect to each of the candidate queries to determine whether the data set satisfies any of the candidate queries is accomplished in the method 300 by step 312.

Stated generally, the first step of the evaluation method of the invention involves simplifying query terms including complex operators so that a quick, approximate evaluation of the data set with respect to all of the queries can be performed. This approximate evaluation identifies the candidate queries (i.e., queries that may be satisfied by the data set) by eliminating from further consideration all queries that cannot be satisfied by the data set even when the query is approximated (i.e., the constraints for satisfaction of the query are relaxed). The increased speed with which the data set can be evaluated with respect to approximated query terms is counteracted by the strong likelihood that some approximated queries will be deemed satisfied by the data set even though, in reality, the queries (i.e., the non-approximated queries) are not satisfied. However, the penalty attendant the necessity to further evaluate the candidate queries is more than offset by the increase in speed. Consequently, the two step approach of the invention results in the ability to process queries more rapidly than has previously been the case.

In one particular embodiment of the invention, the approximation step 301 is accomplished by Booleanizing all of the operators of the execution plan. Herein, "Booleanization" refers to redefining each operator of an execution plan to be a Boolean operator, either a Boolean AND or a Boolean OR. For example, the operator PARAGRAPH, which is satisfied if each of the expressions of the query term appear in the same paragraph is, when Booleanized, replaced by a Boolean AND operator, requiring only that each of the expressions appear in the same data set. FIG. 4A illustrates the execution plan 200 after Boolean approximation of the combination operators of the execution plan 200. TABLE B shows the Boolean approximation of some combination operators that can be used with the invention.

TABLE B

| Operator | Boolean Approximations |
|---|---|
| | Boolean Approximation of Operator |
| ACCRUE | OR |
| AND | AND |
| IN | AND |
| NEAR | AND |
| OR | OR |
| PARAGRAPH | AND |
| PHRASE | AND |
| SENTENCE | AND |

It should be noted that the Boolean AND and OR that are used in the Booleanization of the execution plan are more limited than the AND and OR operators that can be part of the execution plan before Booleanization. The Boolean are AND and OR triggered simply by the occurrence (as appropriate to the Boolean operator) of evidence that can satisfy an evidence descriptor or query term that is part of the query term including the Boolean AND or OR. The AND and OR operators used in the unapproximated execution plan are not as straightforward as testing for the presence or absence of the query terms but may involve mathematical evaluations of the query terms or evidence descriptors that are part of the query term.

Booleanization enables the evaluation of each query term to become a straightforward analysis of a Boolean expression that may result in the triggering of the node corresponding to the query term. A node is triggered either when the node is activated (the query term corresponding to the node is satisfied) or when the node is deactivated (the query term corresponding to the node is precluded from being satisfied).

It is also possible to approximate evidence operators. For example, the TYPO operator, which specifies evidence that is similar in spelling to an evidence pattern, could be approximated by an operator that calculates the number or percentage of letters that two words have in common. Or, a mathematical operators such as an operator that calculates the square root of a number (which is a relatively complex calculation) could be approximated with a sequence of other, simpler mathematical operations that approximate the calculation of a square root. Or, an operator that searches for an event (e.g., mergers and acquisitions) that requires a relatively complex evaluation could be approximated by a simpler operator (e.g., the occurrence of two company names in the same document) that requires a simpler evaluation.

Once the operators of the query terms have been approximated, evaluation of a data set begins. In step 302, a piece of evidence is selected from the data set. The method 300 causes the piece of evidence to be compared to one or more evidence descriptors of the execution plan. Therefore, after a piece of evidence is selected, an evidence descriptor is selected, as shown by step 303. In step 304, the piece of evidence is compared to the evidence descriptor. If the piece of evidence does not match the evidence descriptor, then, in step 310, a determination is made as to whether there is another evidence descriptor in the execution plan that has not, but should be, compared to the piece of evidence. If so, then an evidence descriptor is selected (step 303) and compared (step 304). If not, then, in step 311, a determination is made as to whether there is another piece of evidence in the data set that should be compared to one or more evidence descriptors in the execution plan. If there is, then another piece of evidence is selected from the data set (step 302). If there is not, then, in step 312, each query that has been identified as a candidate query is evaluated, without approximation of any of the operators of the query terms of the query, as described in more detail below.

If, in step 304, the piece of evidence does match the evidence descriptor, then, in step 305, identification of the piece of evidence that matched the corresponding evidence descriptor is recorded. This information is useful in the later evaluation of each candidate query.

Figure 4B:
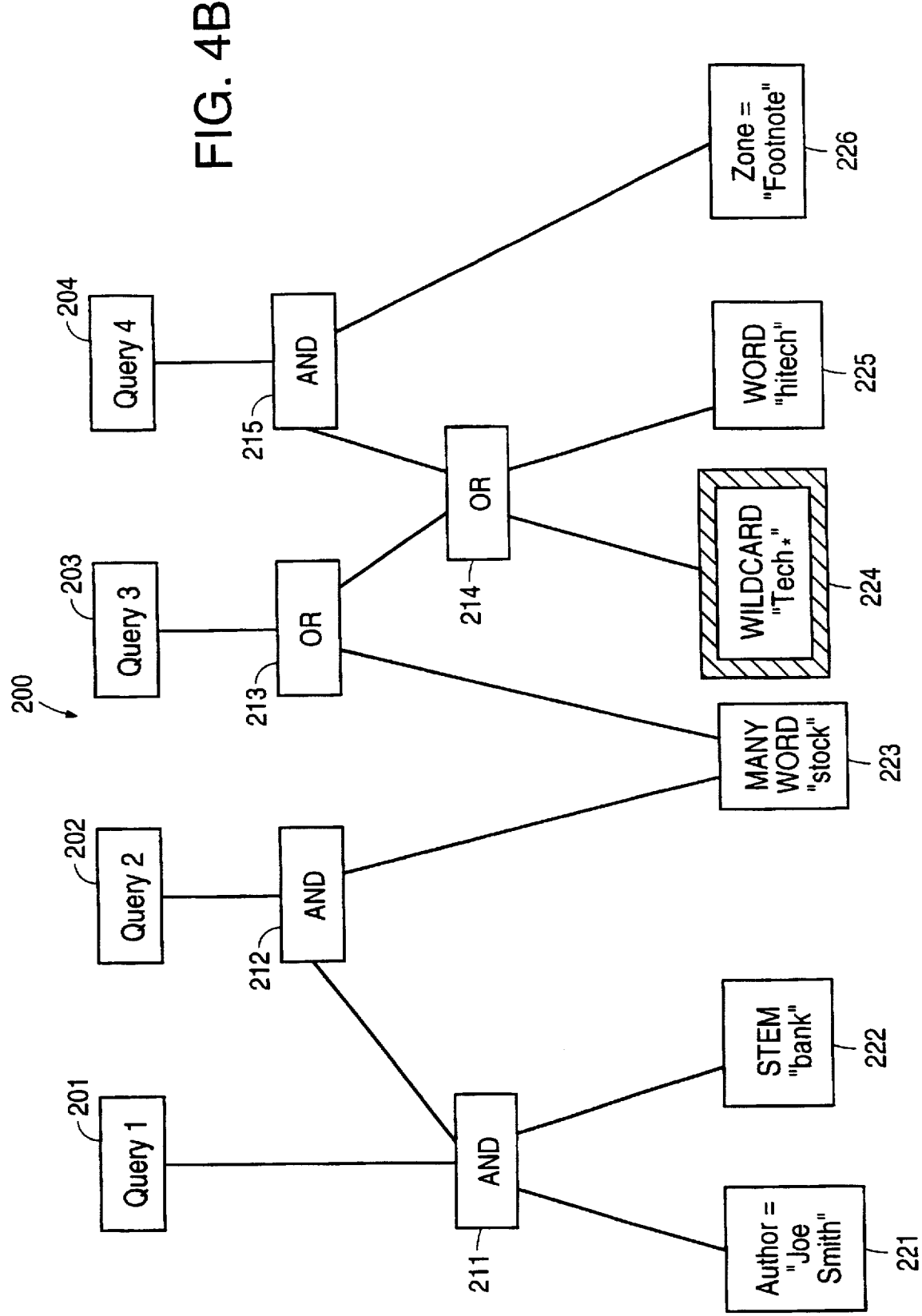

In step 306, a determination is made as to whether the leaf represented by the matched evidence descriptor has already been triggered (i.e., identified as matched by a previous piece of evidence of the data set currently being evaluated). If yes, then the method 300 continues by making a determination as to whether there is another evidence descriptor in the execution plan that has not, but should be, compared to the current piece of evidence (step 310). If no, then, in step 307, the leaf is triggered. FIG. 4B illustrates the activation of the leaf 224 in the execution plan 200 by, for example, the occurrence of the word "technology" in a document being evaluated. (Activation is shown FIGS. 4B through 4E by a hatched area surrounding a leaf or node.)

Figure 4C:
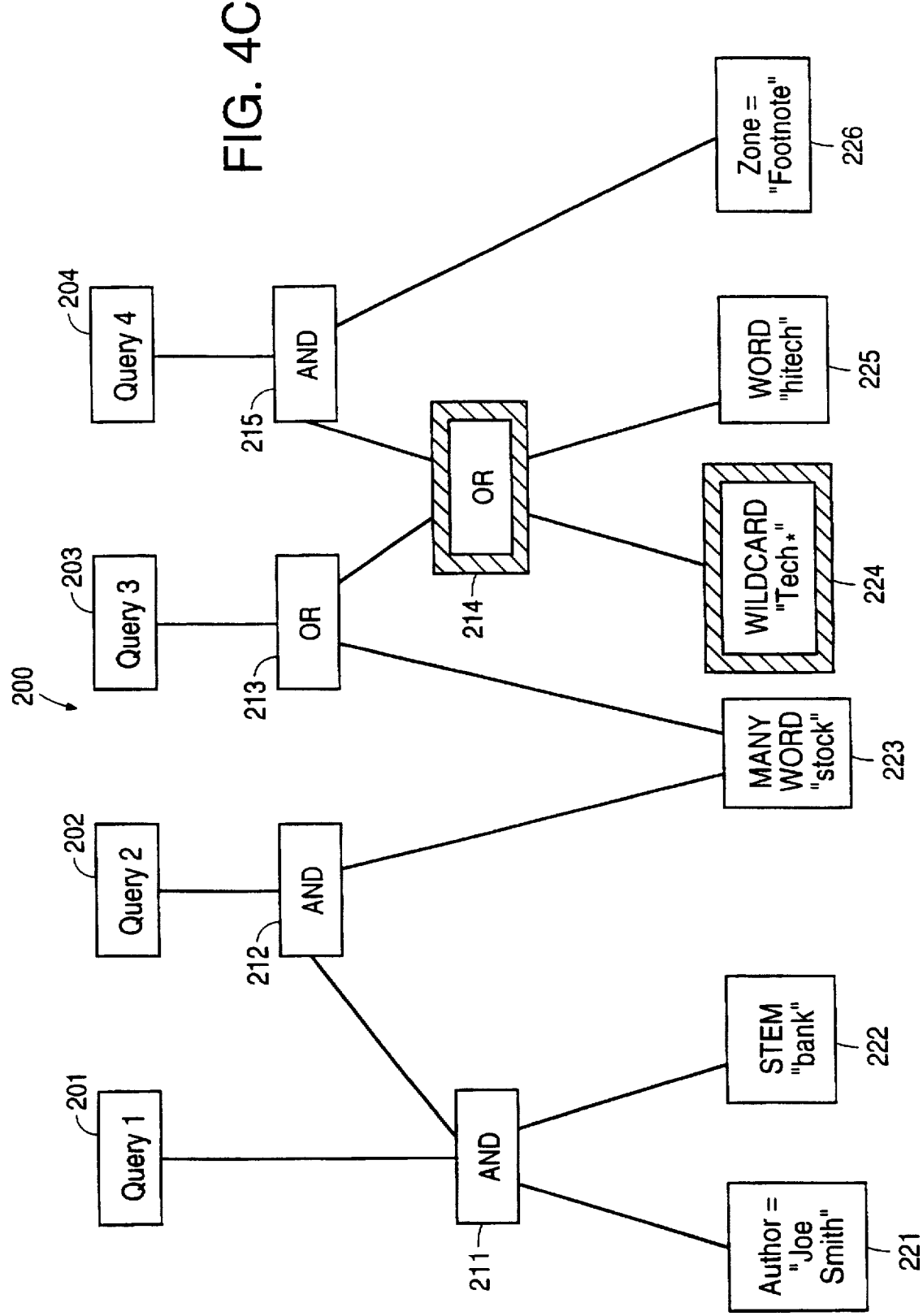

In step 308, after a new leaf is triggered, the query term associated with each untriggered node that is connected in the execution plan to a triggered leaf or node is evaluated to determine the trigger status of the untriggered node. The evaluation can result in the activation or deactivation of the node (the node is triggered), or neither of these (the node is untriggered). If the node is triggered, then the query term associated with each untriggered node that is connected in the execution plan to the newly triggered node is evaluated to determine the trigger status of the untriggered node. The process of evaluating query terms of untriggered nodes continues until the query term associated with each node connected to a triggered node has been evaluated. FIG. 4C illustrates the activation of the node 214 in the execution plan 200, resulting from the activation of the leaf 224. The node 214 is activated immediately because the query term formed using the operator of the node 214 has been approximated by a Boolean OR operator.

In step 309, each root for which all of the associated nodes and leaves have been activated is itself activated and the corresponding query is identified as a candidate query.

Figure 4D:
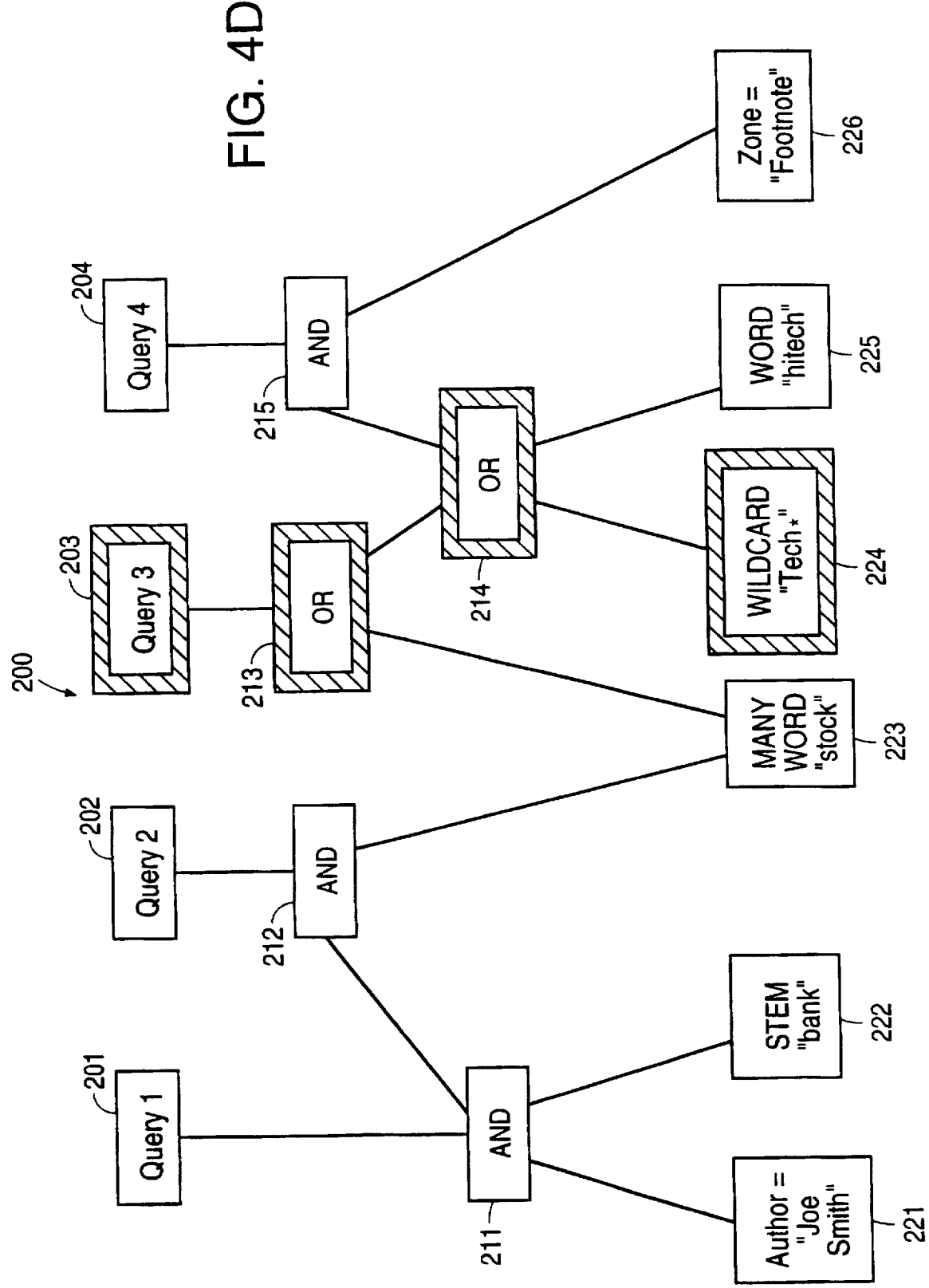

FIG. 4D illustrates the activation of the root 203 in the execution plan 200, resulting from the activation of all of the nodes (nodes 213 and 214) of the query represented by the root 203. The root 203 is activated immediately because the all of the nodes that are part of the query are approximated by the Boolean OR operator.

Next, if appropriate, the piece of evidence is compared to other evidence descriptors (step 310) and any remaining pieces of evidence are also compared to evidence descriptors (step 311). As each piece of evidence is compared to new evidence descriptors and as further pieces of evidence are checked, additional leaves and nodes of the execution plan are triggered, the triggering cascading through the execution plan. An important aspect of the invention is that once a leaf or node is triggered, it is no longer necessary to evaluate that leaf or node for possible triggering, thus enabling evaluation of a data set with respect to the execution plan with even greater rapidity.

FIG. 4E illustrates the execution plan 200 after completion of the approximated evaluation of the text document. Since the text document also includes a footnote zone, the leaf 226 has been activated. The node 215 is also activated since both the leaf 226 and the node 214 are activated. Note that the node 215 could not be activated until the leaf 226 was activated because the node 215 is approximated by the Boolean AND operator. Activation of the node 215 also results in the activation of the root 204.

After all of the pieces of evidence of a data set have been checked against the evidence descriptors of the execution plan, there will typically be one or more queries that have been identified as candidate queries. It is, of course, possible that no queries will have been identified as candidate queries, in which case the method 300 ends, the data set having been identified as one that does not satisfy any of the queries of the execution plan. However, more likely, there are several approximated queries that have been satisfied by the data set. In FIG. 4E, the queries represented by roots 203 and 204 have been identified as candidate queries.

In step 312, each candidate query is rigorously and completely evaluated, i.e., evaluated without approximation of any of the query terms of the query. In the execution plan 200 shown in FIG. 4E, for example, the candidate query of root 204 is satisfied if the word "technology" appeared in a footnote zone of the text document. In many situations, an execution plan having thousands of queries will have only a dozen or so queries that are identified as candidate queries. Since, as discussed above, evaluation of an approximated query can generally be accomplished much faster than evaluation of a query that is not approximated, the identification and evaluation of candidate queries can be performed much more rapidly than can an evaluation of each query without approximation of query terms. Further, the sharing of evidence descriptors and query terms discussed above can enable both the approximated evaluation and the full evaluation to be accomplished more rapidly than would otherwise be possible.

If, after the evidence of a data set is evaluated, the query processor 103 determines that the data set satisfies one or more of the queries, then information that identifies that query or set of queries, as well as the data set, is transferred to the results manager 102. The results manager 102 can cause the identifying information to be displayed or the identifying information can be used to cause the appropriate data sets to be displayed. Display, here, encompasses any appropriate manner of conveying the information to a user or users, such as display on a video display device, printing on paper or sending a facsimile transmission. Additionally or alternatively, the results manager 102 can cause the identifying information and data sets to be stored in the results store 106.

The stored identifying information can be structured in any appropriate way. For example, lists of data sets that satisfy each query can be stored. (If the data sets are text documents, for example, the lists can include the file name of the relevant text documents.) Alternatively or additionally, lists of queries that satisfy each data set can be stored.

According to the invention, it is also possible to evaluate multiple data sets simultaneously. This can be accomplished by storing a unique version of the execution plan for use in evaluating each data set or by using conventional multiprocessing techniques, such as threading, to share the execution plan among multiple data streams.

It is anticipated that the invention will have wide application to evaluating data sets of a large variety of types. For example, the invention can be used to evaluate each of an arbitrary number of text documents to determine whether one or more of the text documents satisfies any of an arbitrary number of user-specified queries regarding the content of the text documents. As a particular example, the invention can be used to monitor in real-time, for each of a multiplicity of users, the news stories that are transmitted by a news wire service. As part of such monitoring, the invention could be used, for example, to evaluate each news story to determine if the news story contains information relevant to a topic of interest, such as mergers and acquisitions. The invention could further, for example, be used to determine if the information contained in the news story relates to a particular time period of interest, such as a specified period of weeks after announcement of an interest rate change by the Federal Reserve. As can be imagined, the formulation of a query to describe these constraints will typically be quite complex, since the expression of information in the news story that can be used to evaluate whether the constraints are satisfied can take a variety of forms. Thus, this particular example illustrates the applicability of the invention in a situation in which the queries are often rather complex. (The number of such queries can also be quite large if, for example, there are many users that wish to monitor the incoming news stories.) As indicated above, the invention can evaluate large numbers of data sets (here, text documents) much more rapidly than previous methods of evaluation. Illustratively, using a computer system including a 90 MHz Intel Pentium processor, the invention can evaluate approximately 2–3 typical news wire stories per second to determine which, if any, of the news wire stories satisfy any of more than 100,000 complex (i.e., including 20–40 query terms) queries.

As another example, the invention can also be used to evaluate each of an arbitrary number of fields of a database to determine whether one or more of the fields satisfies any of an arbitrary number of user-specified queries regarding the content of the fields. For example, the invention can be used to monitor an airline reservations database. As part of such monitoring, the invention could be used to monitor the fields associated with a flight or flights to a particular destination during a particular time period to determine if previously fully booked such flights become available. As can be imagined, the queries for such monitoring are typically rather simple. However, there may be many travel agents monitoring such information, thus making the number of queries quite large. Thus, this particular example illustrates the applicability of the invention in a situation in which the queries are rather simple, but the number of queries is large.

As yet another example of use of the invention in monitoring a database, the invention could be used to monitor a call-tracking database which includes data regarding calls made to the customer service representatives of an organization. Evidence could be created from the database that represents the contents of each call, as well as cumulative statistics for a group of calls. As part of such monitoring, the invention could be used to specify appropriate queries to monitor the fields associated with the number of "open calls" (i.e., calls which have not been disposed of in some manner) for each customer service representative to ascertain when the number exceeds a predetermined threshold. Appropriate queries could also be constructed to monitor fields of the database to determine the "close rate" (i.e., percentage of calls which have been disposed of in some manner) for each customer representative to ascertain when the rate falls below a predetermined threshold. Appropriate queries could also be constructed to monitor the cumulative number of complaints received about particular topics to ascertain when that number exceeds a predetermined amount. Appropriate queries could also be specified to monitor the length of time which calls stay open, so that calls open longer than a predetermined length of time can be identified. For example, a query of this last type which monitors the length of open time for calls regarding serious problems with a particular word processing program might be expressed as, for example: (PRODUCT="XYZ wordprocessing program") AND (OPEN>"1 week") AND (ACCRUE MANY "crash" OR "halt" OR "fault" OR "corrupt").

The invention could also be used to monitor sets of data consisting entirely of a stream of numeric information. For example, the invention could be used to monitor a data stream of continuously updated financial information such as stock prices, interest rates and currency exchange rates. The evidence extracted from the data stream would be the particular stock prices, interest rates and currency exchange rates at particular times. Appropriate queries (e.g., mathematical combinations of particular evidence descriptors) could be constructed regarding this information to, for example, identify arbitrage opportunities.

Additionally, the invention can be used as a filter. For example, the invention could be used as a content-based "kiddie filter" that monitors a stream of data (e.g., audio, video or text data from a source such as the Internet or television) so that inappropriate material can be removed before the data is made accessible to a child.

Various embodiments of the invention have been described. The descriptions are intended to be illustrative, not limitative. Thus, it will be apparent to one skilled in the art that certain modifications may be made to the invention as described without departing from the scope of the claims set out below.

I claim:

1. A method for evaluating a set of data to determine whether the set of data satisfies one or more of a plurality of queries, the contents of the set of data capable of being described by one or more pieces of evidence, the queries being arranged in an execution plan of queries in which each query is operably related to one or more other queries, each of the plurality of queries including one or more query terms, each query term including one or more evidence descriptors that can be related to a combination operator, each evidence descriptor describing a piece of evidence or the characteristics of a piece or pieces of evidence, the method comprising the steps of:

comparing each piece of evidence as the data set is received to one or more of the evidence descriptors;

identifying each evidence descriptor that is satisfied by a piece of evidence;

evaluating each query term that includes a satisfied evidence descriptor or another query term that has been satisfied to determine whether the query term is satisfied; and identifying each query for which all query terms have been satisfied as a query that is satisfied by the set of data.

2. A method as in claim 1, wherein at least one query term is operably related to another query term by sharing at least one evidence descriptor that is part of each of the operably related query terms.

3. A method as in claim 2, wherein the step of comparing further comprises the steps of:

identifying the type of each of the evidence descriptors;

identifying the type of each piece of evidence; and comparing each piece of evidence to each evidence descriptor that is of the same type as the piece of evidence.

4. A method as in claim 2, further comprising the steps of:

defining one or more types of evidence;

identifying the type or types of the evidence descriptors; and modifying the one or more types of evidence in response to the identified type or types of evidence descriptors.

5. A method as in claim 1, wherein the step of comparing further comprises the steps of:

identifying the type of each of the evidence descriptors;

identifying the type of each piece of evidence; and comparing each piece of evidence to each evidence descriptor that is of the same type as the piece of evidence.

6. A method as in claim 5, further comprising the steps of:

defining one or more types of evidence;

identifying the type or types of the evidence descriptors; and modifying the one or more types of evidence in response to the identified type or types of evidence descriptors.

7. A method as in claim 1, further comprising the steps of:

defining one or more types of evidence;

identifying the type or types of the evidence descriptors; and modifying the one or more types of evidence in response to the identified type or types of evidence descriptors.

8. A method as in claim 1, wherein the set of data is arranged as a database.

9. A method for evaluating a set of data to enable identification of, from a plurality of queries that each include at least one evidence descriptor, each candidate query that may be satisfied by the set of data, the method comprising the steps of:

identifying the type of each of the evidence descriptors;

identifying the type of each piece of evidence in the set of data;

comparing each piece of evidence in the set of data to each of the evidence descriptors that are of the same type as the piece of evidence; and identifying each of the evidence descriptors that is satisfied by a piece of evidence, wherein only a query including a satisfied evidence descriptor can be a candidate query.

10. A method as in claim 9, wherein the step or steps comprising the step of comparing are dependent upon the type of the element and the evidence descriptor being compared.

11. A method as in claim 1, wherein a plurality of sets of data are evaluated.

12. A method as in claim 1, wherein the plurality of sets of data are evaluated sequentially.

21

13. A method as in claim 12, wherein:

the contents of the set of data are capable of being described by one or more pieces of evidence;

each of the plurality of queries includes one or more query terms, each query term including one or more evidence descriptors that can be related to a combination operator, each evidence descriptor describing a piece of evidence or the characteristics of a piece or pieces of evidence; and at least one query term is operably related to another query term by sharing at least one evidence descriptor that is part of each of the operably related query terms.

14. A method as in claim 13, further comprising the steps of:

defining one or more types of evidence;

identifying the type or types of the evidence descriptors; and modifying the one or more types of evidence in response to the identified type or types of evidence descriptors.

15. A method as in claim 12, wherein the plurality of queries are arranged in an execution plan of queries in which each query is operably related to one or more other queries.

16. A method as in claim 1, further comprising establishing a duplication of the plurality of queries for each of the sets of data, and wherein each of the plurality of sets of data are evaluated simultaneously using one of the plurality of queries.

17. A method as in claim 1, wherein the set of data is textual data.

18. A method for evaluating a set of data to determine whether the set of data satisfies one or more of a plurality of queries, each query having a query term and an approximation of the query term, comprising the steps of:

identifying one or more candidate queries that may be satisfied by the set of data using the approximation of the query term; and evaluating each of the candidate queries using the query term to determine which, if any, of the candidate queries are satisfied by the set of data.

19. A method as in claim 18, wherein:

the contents of the set of data are capable of being described by one or more pieces of evidence;

each of the plurality of queries includes one or more query terms, each query term including one or more evidence descriptors that can be related to a combination operator, each evidence descriptor describing a piece of evidence or the characteristics of a piece or pieces of evidence; and the step of identifying further comprises the steps of:

identifying the type of each of the evidence descriptors;

identifying the type of each piece of evidence;

comparing each piece of evidence to each evidence descriptor that is of the same type as the piece of evidence; and identifying each evidence descriptor that is satisfied by a piece of evidence, wherein only a query including a satisfied evidence descriptor can be a candidate query.

20. A method as in claim 19, wherein the step of identifying further comprises:

establishing an approximation of one or more of the query terms to create an execution plan of approximated query terms;

evaluating the query terms in the execution plan of approximated query terms to determine which, if any,

22 of the queries in the execution plan of approximated query terms are satisfied by the set of data; and identifying each query in the execution plan of approximated query terms for which all query terms in the query are satisfied as a candidate query.

21. A method as in claim 19, further comprising the steps of:

defining one or more types of evidence;

identifying the type or types of the evidence descriptors; and modifying the one or more types of evidence in response to the identified type or types of evidence descriptors.

22. A method as in claim 18, wherein the step of identifying further comprises the steps of:

establishing an approximation of one or more of the query terms to create an execution plan of approximated query terms;

evaluating the query terms in the execution plan of approximated query terms to determine which, if any, of the queries in the execution plan of approximated query terms are satisfied by the set of data; and identifying each query in the execution plan of approximated query terms for which all query terms in the query are satisfied as a candidate query.

23. A method as in claim 18, wherein the plurality of queries includes a plurality of evidence descriptors that can be compared to one or more pieces of evidence that represent a portion of the content of the set of data to ascertain whether a piece of evidence satisfies an evidence descriptor, the method further comprising the steps of:

defining one or more types of evidence;

identifying the type or types of the evidence descriptors; and modifying the one or more types of evidence in response to the identified type or types of evidence descriptors.

24. A method as in claim 13, wherein the step of identifying further comprises the steps of:

establishing an approximation of one or more of the query terms to create an execution plan of approximated query terms;

evaluating the query terms in the execution plan of approximated query terms to determine which, if any, of the queries in the execution plan of approximated query terms are satisfied by the set of data; and identifying each query in the execution plan of approximated query terms for which all query terms in the query are satisfied as a candidate query.

25. A method as in claim 13, wherein:

the step of identifying further comprises the steps of:

identifying the type of each evidence descriptor;

identifying the type of each piece of evidence;

comparing each piece of evidence to each evidence descriptor that is of the same type as the piece of evidence; and identifying each evidence descriptor that is satisfied by a piece of evidence, wherein only a query including a satisfied evidence descriptor can be a candidate query.

26. A method as in claim 25, wherein the step of identifying further comprises the steps of:

establishing an approximation of one or more of the query terms to create an execution plan of approximated query terms;

evaluating the query terms in the execution plan of approximated query terms to determine which, if any, of the queries in the execution plan of approximated query terms are satisfied by the set of data; and identifying each query in the execution plan of approximated query terms for which all query terms in the query are satisfied as a candidate query.

27. A method as in claim 26, further comprising the steps of:

defining one or more types of evidence;

identifying the type or types of the evidence descriptors; and modifying the one or more types of evidence in response to the identified type or types of evidence descriptors.

28. A method for use in evaluating a set of data to determine whether the set of data satisfies one or more queries, the one or more queries including a plurality of evidence descriptors that can be compared to one or more pieces of evidence that represent a portion of the content of the set of data to ascertain whether a piece of evidence satisfies an evidence descriptor, the method comprising the steps of:

defining one or more types of evidence;

identifying the type or types of the evidence descriptors; and modifying the one or more types of evidence in response to the identified type or types of evidence descriptors.

29. A method as in claim 28, further comprising the step of creating one or more pieces of evidence, each piece of evidence being of one of the modified types.

30. A method as in claim 28, wherein the step of modifying further comprises adding a type to the defined types that is identified as a type of one of the evidence descriptors.

31. A method as in claim 28, wherein the step of modifying further comprises deleting a type from the defined types that is not identified as a type of one of the evidence descriptors.

32. A method for constructing an execution plan of queries for use in evaluating a set of data to determine whether the set of data satisfies one or more of the queries, comprising the steps of:

inputting a plurality of queries; and operably relating each query to another query.

33. A method as in claim 32, wherein the step of operably relating further comprises identifying each other query that is operably related to the query.

34. A method as in claim 32, further comprising the step of translating each query into one or more query terms, and wherein, for an additional query that is input after one or more previous queries, the step of operably relating further comprises the steps of:

comparing each of the input query terms of the additional query to the query terms that already exist as part of the execution plan to determine which, if any, of the input query terms are different than the existing query terms;

identifying, for each of the different input query terms, one or more relationships to input query terms that are the same as existing query terms; and adding the different input query terms to the execution plan such that the different input query terms have relationships to existing query terms of the execution plan that are the same as the relationships between the different query terms and corresponding input query terms.

35. A method as in claim 32, further comprising the steps of:

translating each query into one or more query terms; and removing a query from the execution plan, the step of removing further comprising the steps of:

comparing each of the query terms of the query to be removed to the query terms of other queries that exist as part of the execution plan to determine which, if any, of the query terms of the query to be removed are different than the other existing query terms; and removing the different query terms from the execution plan.

36. A method as in claim 32, wherein the contents of the set of data are capable of being described by one or more pieces of evidence, the method further comprising the steps of:

translating each query into one or more query terms, each query term including one or more evidence descriptors that can be related to a combination operator, each evidence descriptor describing a piece of evidence or the characteristics of a piece or pieces of evidence; and operably relating at least one query term to another query term by sharing at least one evidence descriptor that is part of each of the operably related query terms.

37. A method as in claim 36, wherein, for an additional query that is input after one or more previous queries, the step of operably relating further comprises the steps of:

comparing each of the input query terms of the additional query to the query terms that already exist as part of the execution plan to determine which, if any, of the input query terms are different than the existing query terms;

identifying, for each of the different input query terms, one or more relationships to input query terms that are the same as existing query terms; and adding the different input query terms to the execution plan such that the different input query terms have relationships to existing query terms of the execution plan that are the same as the relationships between the different query terms and corresponding input query terms.

38. A method as in claim 37, further comprising the step of defining, for at least one evidence descriptor or combination operator, a corresponding approximation of the evidence descriptor or combination operator.

39. A method as in claim 36, further comprising the step of defining, for at least one evidence descriptor or combination operator, a corresponding approximation of the evidence descriptor or combination operator.

40. A method as in claim 36, wherein the step of operably relating at least one query term to another query term further comprises sharing at least one combination operator that is part of operably related query terms.

41. A method as in claim 32, wherein the contents of the set of data are capable of being described by one or more pieces of evidence, the method further comprising the steps of:

translating each query into one or more query terms, each query term including one or more evidence descriptors that can be related to a combination operator, each evidence descriptor describing a piece of evidence or the characteristics of a piece or pieces of evidence; and operably relating each query term to each other query term that includes an equivalent evidence descriptor or combination operator by sharing each equivalent evidence descriptor or combination operator.

42. A method for constructing an execution plan of queries for use in evaluating a set of data to determine whether the set of data satisfies one or more of the queries, the contents of the set of data capable of being described by one or more pieces of evidence, the method comprising the steps of:

inputting a plurality of queries;

translating each query into one or more query terms, each query term including one or more evidence descriptors that can be related to a combination operator, each evidence descriptor describing a piece of evidence or the characteristics of a piece or pieces of evidence; and defining, for at least one evidence descriptor or combination operator, a corresponding approximation of the evidence descriptor or combination operator.

43. A method as in claim 42, wherein the step of defining further comprises defining, for each evidence descriptor or combination operator, a corresponding approximation of the evidence descriptor or combination operator.

44. An execution plan stored within a memory for use in controlling a system for evaluating a set of data to determine whether the set of data satisfies one or more of a plurality of queries, the execution plan comprising a plurality of independent queries, wherein each of the queries of the execution plan has one or more query terms and each query sharing a query term with another query so that the queries are operably related to another of the queries of the execution plan.

45. An execution plan as in claim 44, wherein each query identifies each other query that is operably related to the query.

46. An execution plan stored in a memory for use in evaluating a set of data to determine whether the set of data satisfies one or more of a plurality of queries, the contents of the set of data being described by one or more pieces of evidence, the execution plan comprising a plurality of queries, each query including one or more query terms, each query term including one or more evidence descriptors that can be related to a combination operator, each evidence descriptor describing a piece of evidence or the characteristics of a piece or pieces of evidence, wherein at least one evidence descriptor is shared by more than one query term.

47. An execution plan as in claim 46, wherein the execution plan includes at least one combination operator that is shared by more than one query term.

48. An execution plan as in claim 46, wherein, for at least one evidence descriptor or combination operator, a corresponding approximation of the evidence descriptor or combination operator is defined.

49. An execution plan stored in a memory for use in evaluating a set of data to determine whether the set of data satisfies one or more of a plurality of queries, the contents of the set of data being described by one or more pieces of evidence, the execution plan comprising a plurality of queries, each query including one or more query terms, each query term including one or more evidence descriptors that can be related to a combination operator, each evidence descriptor describing a piece of evidence or the characteristics of a piece or pieces of evidence, wherein each evidence descriptor of a query term that is equivalent to an evidence descriptor of another query term is shared with that query term, and wherein each combination operator of a query term that is equivalent to a combination operator of another query term is shared with that query term.

50. An execution plan stored in a memory for use in evaluating a set of data to determine whether the set of data satisfies one or more of a plurality of queries, the contents of the set of data capable of being described by one or more pieces of evidence, the execution plan comprising a plurality of queries wherein each query including one or more query terms, each query term including one or more evidence descriptors that can be operably related to a combination operator, each evidence descriptor describing a piece of evidence or the characteristics of a piece or pieces of evidence, wherein for at least one evidence descriptor or combination operator, a corresponding approximation of the evidence descriptor or combination operator is defined.

51. An execution plan as in claim 50, wherein, for each evidence descriptor or combination operator, a corresponding approximation of the evidence descriptor or combination operator is defined.

52. A system for evaluating a set of data to determine whether the set of data satisfies one or more of a plurality of queries, the contents of the set of data capable of being described by one or more pieces of evidence, the queries being arranged in an execution plan of queries in which each query is operably related to one or more other queries, each of the plurality of queries including one or more query terms, each query term including one or more evidence descriptors that can be related to a combination operator, each evidence descriptor describing a piece of evidence or the characteristics of a piece or pieces of evidence, the system comprising:

means for comparing each piece of evidence to one or more of the evidence descriptors as the data set is received;

means for identifying each evidence descriptor that is satisfied by a piece of evidence;

means for evaluating each query term that includes a satisfied evidence descriptor or another query term that has been satisfied to determine whether the query term is satisfied; and means for identifying each query for which all query terms have been satisfied as a query that is satisfied by the set of data.

53. A system for evaluating a set of data to enable identification of, from a plurality of queries that each include at least one evidence descriptor, each candidate query that may be satisfied by the set of data, the system comprising:

means for identifying the type of each of the evidence descriptors;

means for identifying the type of each piece of evidence in the set of data;

means for comparing each piece of evidence in the set of data to each of the evidence descriptors that are of the same type as the piece of evidence; and means for identifying each of the evidence descriptors that is satisfied by a piece of evidence, wherein only a query including a satisfied evidence descriptor can be a candidate query.

54. A system for evaluating a set of data to determine whether the set of data satisfies one or more of a plurality of queries, each query having a query term and an approximation of the query term, comprising:

means for identifying one or more candidate queries based on the approximation of the query term that may be satisfied by the set of data; and means for evaluating each of the candidate queries based on the query term to determine which, if any, of the candidate queries are satisfied by the set of data.

55. A system for use in evaluating a set of data to determine whether the set of data satisfies one or more queries, the one or more queries including a plurality of evidence descriptors that can be compared to one or more pieces of evidence that represent a portion of the content of the set of data to ascertain whether a piece of evidence satisfies an evidence descriptor, the system comprising:

means for defining one or more types of evidence;

means for identifying the type or types of the evidence descriptors; and means for modifying the one or more types of evidence in response to the identified type or types of evidence descriptors.

56. A system for constructing an execution plan of queries for use in evaluating a set of data to determine whether the set of data satisfies one or more of the queries, comprising:

means for inputting a plurality of queries; and means for operably relating each query to another query.

57. A system for constructing an execution plan of queries for use in evaluating a set of data to determine whether the set of data satisfies one or more of the queries, the contents of the set of data capable of being described by one or more pieces of evidence, the system comprising:

means for inputting a plurality of queries;

means for translating each query into one or more query terms, each query term including one or more evidence descriptors that can be related to a combination operator, each evidence descriptor describing a piece of evidence or the characteristics of a piece or pieces of evidence; and means for defining, for at least one evidence descriptor or combination operator, a corresponding approximation of the evidence descriptor or combination operator.

\* \* \* \* \*